United States Patent
Cutler

(10) Patent No.: US 9,102,416 B1
(45) Date of Patent: Aug. 11, 2015

(54) INERT GAS GENERATING SYSTEM

(75) Inventor: Theron Lee Cutler, Wichita, KS (US)

(73) Assignee: The Boeing Company, Chicago, IL (US)

( * ) Notice: Subject to any disclaimer, the term of this patent is extended or adjusted under 35 U.S.C. 154(b) by 797 days.

(21) Appl. No.: 13/424,471

(22) Filed: Mar. 20, 2012

(51) Int. Cl.
*F02C 7/25* (2006.01)
*B64D 37/32* (2006.01)
*F02C 6/00* (2006.01)
*A62C 3/08* (2006.01)
*A62C 99/00* (2010.01)

(52) U.S. Cl.
CPC . *B64D 37/32* (2013.01); *A62C 3/08* (2013.01); *A62C 99/0018* (2013.01); *F02C 6/00* (2013.01); *F02C 7/25* (2013.01)

(58) Field of Classification Search
CPC ............. F02C 7/25; F02C 6/00; B64D 37/32; A62C 3/08; A62C 99/0018
USPC ............................................... 60/39.091, 779
See application file for complete search history.

(56) References Cited

U.S. PATENT DOCUMENTS

| | | | | |
|---|---|---|---|---|
| 2,365,624 A | * | 12/1944 | Cantello et al. ............... | 137/209 |
| 2,756,215 A | * | 7/1956 | Burgess et al. ............... | 252/372 |
| 2,889,955 A | * | 6/1959 | Naulty et al. ................. | 220/88.3 |
| 3,103,296 A | * | 9/1963 | Gour ............................. | 220/88.3 |
| 3,257,798 A | * | 6/1966 | Hass .............................. | 60/274 |
| 3,389,972 A | * | 6/1968 | Pottharst, Jr. .................. | 422/62 |
| 3,464,801 A | * | 9/1969 | Barstow ........................ | 422/111 |
| 3,630,023 A | * | 12/1971 | Lazar et al. ................. | 60/39.281 |
| 3,847,298 A | * | 11/1974 | Hamilton ..................... | 220/88.3 |
| 4,378,920 A |   | 4/1983 | Runnels |   |
| 4,656,831 A | * | 4/1987 | Budininkas et al. ............ | 60/297 |
| 5,300,265 A | * | 4/1994 | Banks et al. ................... | 422/172 |
| 5,456,064 A | * | 10/1995 | Graves ............................. | 60/276 |
| 5,918,679 A | * | 7/1999 | Cramer .......................... | 169/45 |
| 6,012,533 A | * | 1/2000 | Cramer .......................... | 169/45 |
| 6,634,598 B2 |   | 10/2003 | Susko |   |
| 6,830,219 B1 |   | 12/2004 | Picot et al. |   |
| 7,152,635 B2 |   | 12/2006 | Moravec et al. |   |
| 7,204,868 B2 |   | 4/2007 | Snow, Jr. |   |
| 7,296,399 B2 | * | 11/2007 | Hoff, Jr. ......................... | 60/273 |
| 7,430,858 B2 | * | 10/2008 | Hoff, Jr. ......................... | 60/309 |
| 7,815,148 B2 |   | 10/2010 | Kwok |   |
| 7,837,764 B2 |   | 11/2010 | Sanford |   |
| 7,918,358 B2 |   | 4/2011 | Gupta |   |

(Continued)

OTHER PUBLICATIONS

Aviation Rulemaking Advisory Committee, Fuel Tank Inerting, Task Group 3, Federal Aviation Administration, Fire Safety Branch, Jun. 28, 1998, available at http://www.fire.tc.faa.gov/pdf/TG3.pdf.

*Primary Examiner* — Ehud Gartenberg
*Assistant Examiner* — Lorne Meade
(74) *Attorney, Agent, or Firm* — Ostrager Chong Flaherty & Broitman P.C.

(57) ABSTRACT

A system for generating an inert gas. An embodiment of the system comprises a turbine engine, a compressor and a blower. Additional elements may be provided to condition the air so that it is satisfactory for use in the fuel tank. Such elements include filters, catalytic converters, air pressure regulators, and heat exchangers, as well as elements to monitor the oxygen content and temperature of the air flow. An embodiment of a method for generating an inert gas is also provided. The method comprises combusting fuel to generate engine exhaust, compressing the engine exhaust to generate compressed exhaust, and directing said compressed exhaust into the fuel tank.

12 Claims, 3 Drawing Sheets

(56) References Cited

U.S. PATENT DOCUMENTS

| | | |
|---|---|---|
| 8,499,567 B2* | 8/2013 | Hagh et al. ............ 60/779 |
| 8,561,389 B2* | 10/2013 | Rehling ............ 60/281 |
| 2002/0028168 A1* | 3/2002 | Giacobbe et al. ............ 423/212 |
| 2004/0262455 A1 | 12/2004 | Picot |
| 2007/0056263 A1 | 3/2007 | Roach et al. |
| 2007/0157803 A1 | 7/2007 | McNeil |

* cited by examiner

INERT GAS GENERATING SYSTEM

TECHNICAL FIELD

This disclosure relates generally to vehicle compartments, and more specifically to supplying vehicle compartments (e.g., a fuel tank) with an inert gas to prevent combustion.

BACKGROUND

It is desirable to provide protection for aircraft fuel tanks, which contain fuel and volatile gasses. Fuel tanks can be protected by providing inert gas to the fuel tank ullage, to reduce the oxygen content, and thus combustibility of the tank components. Ullage is the space within the fuel tank which is unfilled by fuel. The goal of these methods is to reduce oxygen content to below a threshold of flammability. For military operations, this threshold is generally 9%, while for commercial operations, this threshold is generally 12%. Maintaining oxygen below the threshold level ensures that combustion is not possible within the tank. Supplying inert gas to fuel tank ullage will be referred to herein as "inerting fuel tank."

A variety of inert gasses and methods of inerting fuel tanks are known. Inert gasses which have been previously considered, or which are currently in use include nitrogen, nitrogen enriched air, carbon dioxide, exhaust gas and flame suppressing agents such as Halon 1301.

Prior methods of inerting a fuel tank typically utilize air with a high nitrogen content as the inert gas. In a first prior method, stored liquid nitrogen, which can be converted to a gaseous form, is supplied to a fuel tank as needed or desired. In a second prior method, compressed atmospheric air drawn from a main engine is fed through diffusion elements within a diffusion system, which filter oxygen out of the atmospheric air. The filtered air, which is nitrogen enriched and oxygen depleted and thus sufficiently inert, is compressed and cooled, and utilized to inert the fuel tank.

In the second prior method, compressed atmospheric air may be drawn as "bleed air" directly from a main engine. Bleed air is typically drawn from within the engine, where the engine turbines have already compressed incoming air. This is a convenient source of compressed air. However, removal of bleed air from the engine reduces engine efficiency. Thus, it would be desirable to provide a system that does not use bleed air.

Further, the diffusion elements which filter oxygen out of the compressed air have a maximum flow capacity. Thus, bleed air systems which enrich atmospheric air through the use of nitrogen diffusion elements have a maximum capacity for providing inert gas to fuel tanks. This maximum capacity means that such filtering systems may not be able to provide sufficient inert gas during all flight phases. For example, during a quick descent, oxygen may flow into the fuel tanks faster than it can be replaced by the inert gas system.

The capacity of a bleed air filtering system may be increased by increasing the number of diffusion elements. This allows inert gas throughput capacity to increase linearly with the number of diffusion elements. However, this adds bulk and weight to the aircraft. Therefore, it would be desirable to provide a system which has a widely varying throughput capacity.

Efforts have been made to utilize hybrid systems combining bleed air powered systems with systems utilizing stored liquid nitrogen. However, such hybrid systems may require more space than either system individually and thus may increase the weight of the aircraft and decrease the amount of space available for other purposes. Further, servicing systems, such as systems for refilling liquid nitrogen tanks, are not generally available at airports.

A system is thus needed having a widely variable capacity to provide inert gas to fuel tanks, and which does not decrease engine efficiency by utilizing bleed air.

SUMMARY

A fuel tank inerting system is disclosed herein which can provide widely varying levels of inert gas, without utilizing bleed air. The system generates inert gas having a mixture of carbon dioxide and nitrogen, rather than only nitrogen. Since carbon dioxide is a heavier gas than nitrogen, carbon dioxide diffuses out of a fuel tank at a lower rate than that for an inert gas containing mostly nitrogen. Additionally, the output capacity of the system is not limited in the way a diffusion system is limited.

The fuel tank inerting system which is the subject of this disclosure generally comprises a turbine engine which is independent of an aircraft's main engines or auxiliary power unit (APU), a compressor and a blower. A variety of additional elements may be provided to condition the air so that it is satisfactory for use in the fuel tank. Such elements include filters, catalytic converters, air pressure regulators, and heat exchangers, as well as elements to monitor the oxygen content and temperature of the air flow.

The turbine engine serves two purposes. The first purpose is to generate an engine exhaust which has a large amount of carbon dioxide. By combusting fuel which contains hydrocarbons, in the presence of atmospheric air, which contains oxygen, the oxygen and hydrocarbons are converted to water and carbon dioxide. The second purpose of the turbine engine is to power the rest of the system—i.e., the compressor and the blower.

The compressor compresses the exhaust from the turbine engine in order to provide inert gas at a pressure sufficient for use in the fuel tanks. The blower draws in atmospheric air for use as a coolant in a heat exchanger, in order to cool down the compressed engine exhaust such that the inert gas is at a temperature suitable for use in the fuel tanks.

The disclosed fuel tank inerting system, using a turbine engine, allows the output of inert gas to be varied as needed. An increase in inert gas output only requires the engine speed to be increased. Further, the use of a turbine engine removes the need to draw bleed air from the main aircraft engine, and therefore avoids corresponding efficiency reduction. Using carbon dioxide as the inert gas decreases the inert gas leak rate out of the fuel tanks as compared to the leak rate for inert gas containing only or mostly nitrogen. Usage of this system also provides for generation of inert gas that is not dependant on the main engine output, as would be the case with a bleed air system. Finally, usage of a system having a turbine engine also increases inert gas output capacity so that it can be used as a fire suppressing agent as a replacement for Halon.

Therefore, in accordance with the teachings of this disclosure, a system for inerting a fuel tank is provided, comprising a combustion engine combusting fuel to generate engine exhaust; a compressor powered by said combustion engine, said compressor compressing said engine exhaust to generate compressed exhaust; and a fuel tank gas distribution system directing said compressed exhaust into the fuel tank.

An aircraft is also provided, comprising: an aircraft body; a fuel tank; a combustion engine combusting fuel to generate engine exhaust; a compressor powered by said combustion engine, said compressor compressing said engine exhaust to generate compressed exhaust; and a fuel tank gas distribution system directing said compressed exhaust into the fuel tank.

A method of inerting a fuel tank is also provided, comprising: combusting fuel to generate engine exhaust; compressing said engine exhaust to generate compressed exhaust; and directing said compressed exhaust into the fuel tank.

Other objects, features and advantages will be apparent when the detailed description of the preferred embodiments is considered in conjunction with the drawings.

BRIEF DESCRIPTION OF THE DRAWINGS

Reference will now be made to the drawings, in which similar elements in different drawings bear the same reference numerals.

DETAILED DESCRIPTION OF THE DRAWINGS

The present disclosure relates to fuel tank inerting systems which may be present on aircraft, ground vehicles, watercraft or other vehicles. Many specific details of certain embodiments of fuel tank inerting systems are set forth in the following description and in FIGS. 1-3 to provide a thorough understanding of such embodiments. One skilled in the art, however, will understand that the present disclosure may have additional embodiments, or that embodiments of the present disclosure may be practiced without several of the details according to the following description. For instance, while certain embodiments reference usage on an aircraft, and relevant aircraft parts, it may be appreciated by those of skill in the art that the techniques described may be applied on a variety of vehicles or in other contexts as desired.

Figure 1:
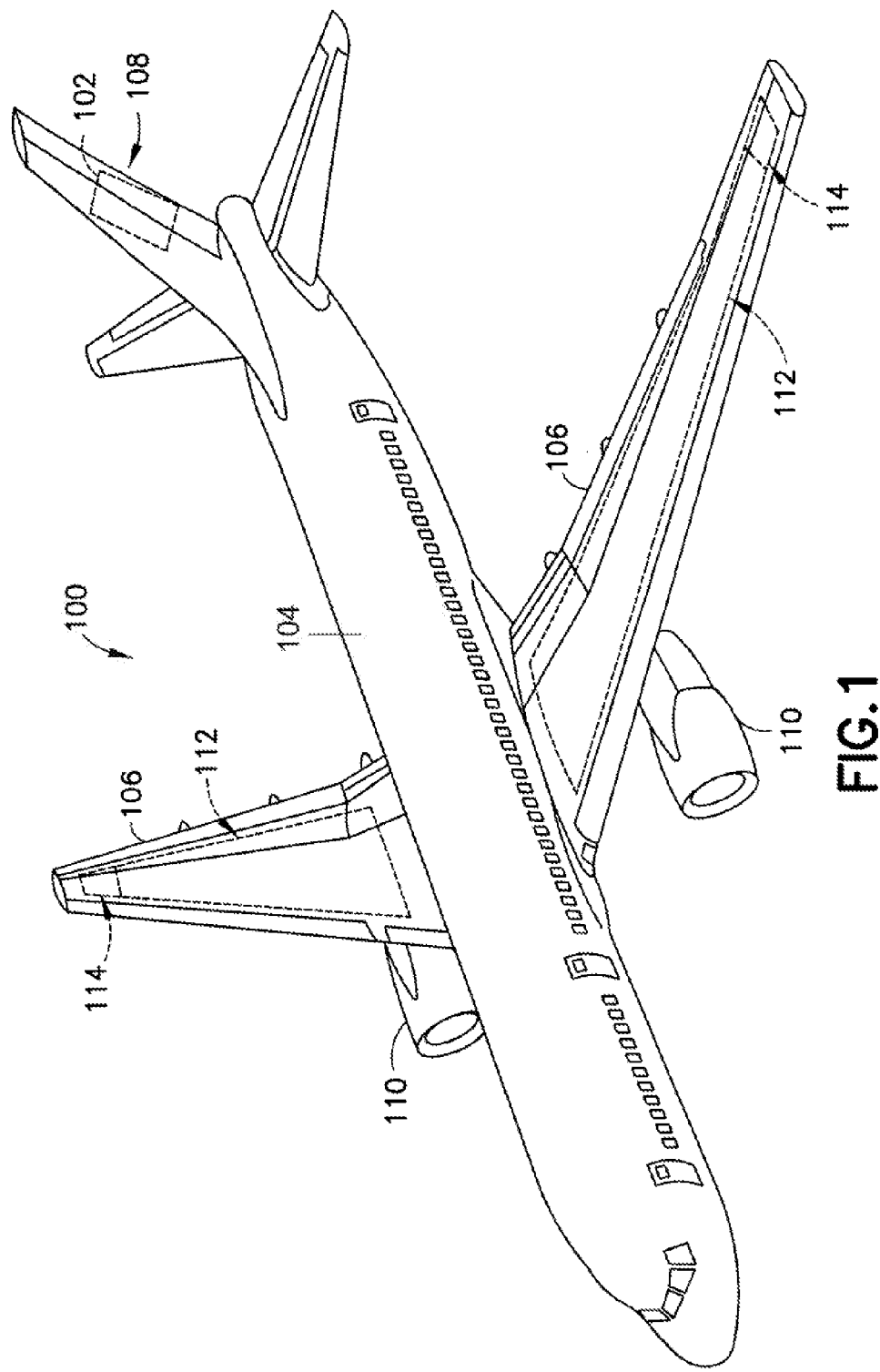
FIG. 1 is a perspective view of an aircraft having an inert gas generating system as disclosed herein.

A fuel tank inerting system will now be described. Although the system may be used in a wide variety of different contexts, such as on various types of vehicles, the system will be described in the context of an aircraft as an example. FIG. 1 depicts an aircraft 100 having a fuselage 104, a pair of wings 106 extending outward from the fuselage 104, a tail section 108, a plurality of main engines 110 and a plurality of fuel tanks 112 located within wings 106. Main engines 110 are mounted on wings and generate power for propelling the aircraft 100. In other embodiments, aircraft 100 may have additional main engines 110, only one main engine 110, and may have an auxiliary power unit (not shown) without departing from the scope of this disclosure.

Fuel tanks 112 may have fuel tank vent 114 operatively coupled to the fuel tanks 112 for venting gas from tanks 112 and supplying gas to tanks 112. Although fuel tanks 112 are depicted within the wings 106, fuel tanks may also be located within other sections of the aircraft 100. An exemplary location for a fuel tank inerting system 102 is depicted at the tail section 108. However, this is just an exemplary location. Weight distribution, proximity to the fuel tanks, spacial integration factors (i.e., space constraints at a location in question) and the presence of a suitable support structure are factors that must be taken into account when choosing a location for the system 102. A fuel tank inerting system 102 may be placed at different locations on the aircraft 100 as needed or desired. Fuel tank inerting system 102 is operatively connected to at least one of the fuel tanks 112 to ensure the gas in the tanks remains incombustible. Because most of the features of the aircraft 100 are conventional, general features of the aircraft will not be described in further detail. In one embodiment, the aircraft 100 is a C-17 aircraft, manufactured by The Boeing Company of Chicago, Ill.

Figure 2:
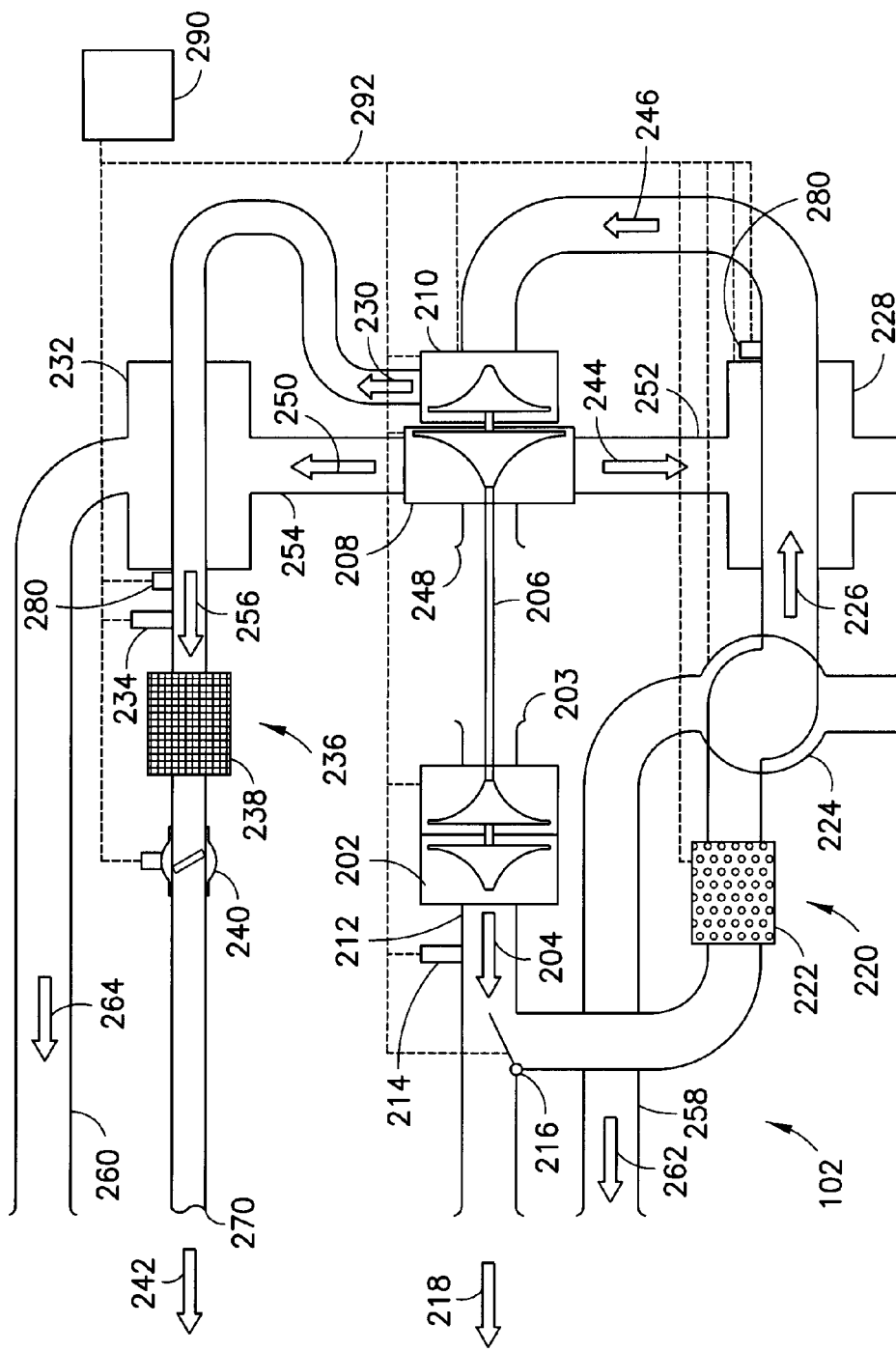
FIG. 2 is a schematic view of an inert gas generating system as disclosed herein.

As depicted in FIG. 2, the fuel tank inerting system 102 comprises a turbine engine 202 drawing atmospheric air in from engine inlet 203 generating exhaust 204 and having a shaft connection 206 with, and thus powering, a low pressure blower 208 and a high pressure compressor 210. Turbine engine 202 serves dual purposes: generating inert gas, and providing power to process that inert gas. The turbine engine 202 is independent from any other engines normally present on an aircraft, such as the main thrust generating aircraft jet engines 110 or any auxiliary power units (APUs) that may be present on the aircraft 100. It should be noted that the engine need not be a gas turbine engine, and may be another type of engine which combusts hydrocarbon fuel with oxygen to generate carbon dioxide. However, on the exemplary aircraft 100, use of a turbine engine would be beneficial.

Exhaust 204 from the independent engine 202 first travels to engine exhaust conduit 212 which has an oxygen sensor 214 measuring the oxygen concentrations within the exhaust 204. Exhaust 204 travels to a bypass valve 216, where a portion of exhaust 204 is selectively diverted to an exhaust outlet 218 or to the rest of the system 102 for further processing. Bypass valve 216 may allow anywhere between 0 and 100 percent of the exhaust 204 flowing from turbine engine 202, depending on criteria which will be discussed in further detail below.

Once past the bypass valve 216, exhaust 204 flows through a series of processing units 220, including a catalytic converter 222 and a particulate separator 224. Catalytic converter 222 chemically converts undesirable products of incomplete combustion, such as carbon monoxide, oxides of nitrogen and unburned hydrocarbons, into inert gasses such as carbon dioxide, nitrogen and water. Particulate separator 224 may be a centrifugal separator, which by inducing rotational motion in the exhaust 204, causes solid particulates such as soot within the exhaust 204 to deposit on a collector. Cleaned exhaust 226 passes out of the separator 224. The separator may be coupled with an intercooler to cool the exhaust 204, which has been heated by the combustion of engine 202.

Cleaned exhaust 226 passes next into a primary intercooler 228 which utilizes a first cooling air stream 244 provided by low pressure blower 208, which draws air from blower inlet 248 and blows first cooling air stream 244 and second cooling air stream 250 through first cooling conduit 252 and second cooling conduit 254, respectively, which deliver air to primary intercooler 228 and secondary intercooler 232, respectively. After passing primary intercooler 228 and secondary intercooler 232, first cooling air stream 244 and second cooling air stream 250 exit first exhaust conduit 258 and second exhaust conduit 260 as first cooler exhaust 262 and second cooler exhaust 264, respectively.

The cooled, cleaned exhaust 246 passes next into high pressure compressor 210 which is powered by the turbine engine 202 and which outputs compressed gas 230 having a required pressure for use in the fuel tanks 112 (shown in FIG. 1). The compressor 210 heats the gas through adiabatic heating, and thus the compressed gas 230 is cooled in secondary intercooler 232. Secondary intercooler 232 utilizes second cooling air stream 250 provided by low pressure blower 208 to cool the compressed gas 230. A set of final processing units 236, including a temperature sensor 234, a filter 238 and a regulator 240 process the cooled, compressed gas 256. Temperature sensor 234 checks to ensure that the compressed inert gas flowing to the fuel tanks 112 is sufficiently cooled.

Additional cooling stages may be added for higher flow rate systems. Filter 238 filters out any remaining particulates or other unwanted components. Regulator 240 acts to limit the pressure of the gas which is output from the system 102, to ensure that the gas is at a satisfactory pressure for inerting the fuel tanks 112. The processed inert gas 242 is provided to the fuel tanks 112 through fuel tank gas distribution system 270.

A control system 290 may be present to receive information from, and control the various components of the system. For example, the control system 290 may control the speed and fuel mix ratio of the turbine engine 202, may control the speed of the blower 208 and compressor 210, and may control the outlet pressure of the regulator 240. Control of the various components is based on information received from the components of the system 102. For example, control system 290 may receive information regarding oxygen levels of the exhaust 204 leaving the turbine engine 202 from oxygen sensor 214. Control system 290 may also receive information regarding the temperature of compressed gas 256 from the temperature sensor 234. Control system 290 may also receive information from, and exhibit control over, any other component within the system 102 to facilitate proper operation of the system 102. The control system 290 may be any element capable of performing these functions, and may, for example, be embodied as hardware or software or a combination of both. Although depicted in FIG. 2 as a standalone component, in alternative embodiments, the control system 290 may embodied as any standalone component or may be partially or fully integrated with another component normally present on the aircraft 100. For example, control system 290 may be an analog or digital electronic device programmed and/or configured to receive information from and exert control over components in the system 102, or may be a software module running on another component within the aircraft 100. Control system 290 may be operatively coupled to the components in the system 102 through control system network 292, depicted in dashed lines in FIG. 2. Control system network 292 represents functional connections between the control system 290 and the components of the system 102 and may therefore comprise any apparatus, device or system for connecting the components. For example, electric wires, fiber optic wires, a wireless connection, or any other method providing the required functionality may be used.

The method of rendering the fuel tanks 112 inert which is used by the system 102 is a process known as "ullage washing" in which the generated inert gas is provided to the ullage space of a fuel tank 112. Ullage is the space in a fuel tank above the liquid contents of the tank.

As mentioned earlier, to maintain the fuel tanks 112 in an inert state, inert gas should be regularly provided to the tanks 112 to maintain oxygen levels at or below a combustibility threshold. The required amount of inert gas will vary depending on different factors, such as fuel usage, ambient pressure increase or decrease, and other factors. Further, inert gas will leak out of the tanks and be replaced by air containing oxygen at a leak rate, which requires a constant or continual flow of inert gas into the tanks to replace the gas which leaked out.

During flight, air containing oxygen may enter fuel tanks 112 and oxygen may evolve out of the fuel and move into the fuel tank ullage. If oxygen enters the fuel tank ullage in sufficient amounts, the fuel tank may become no longer inert. Thus, to maintain tanks in an inert state, inert gas must be supplied at a level sufficient to displace the oxygen from the fuel tank ullage and reduce the oxygen concentrations below the combustibility threshold. An increase in outside atmospheric pressure, due for example to a decrease in altitude during a dive, will also cause atmospheric air containing oxygen to flow into the tank. This may cause the fuel tank to become no longer inert. Thus, while altitude is decreasing, inert gas should be supplied at a level sufficient to displace the incoming oxygen, return the oxygen concentration to below the combustibility threshold and maintain the fuel tanks 112 in an inert state. There may be other conditions during which inert gas must be provided to the fuel tanks 112.

The system 102 has a number of features which permit control of inert gas flow into the fuel tanks 112. First, bypass valve 216 permits control of the amount of exhaust 204 which flows from the engine 202 through the system 102. This valve 216 can be completely shut, permitting no exhaust 204 to flow to the rest of the system 102, or can be completely opened, permitting a maximum amount of gas to flow from the engine 202 to the rest of the system 102. The valve may also be used to limit the amount of exhaust provided to the rest of the system 102 if the temperature of the gas becomes too high. If the maximum amount of exhaust gas 204 currently being produced by the engine 202 is an insufficient amount to inert fuel tanks 112, then the engine 202 may simply be throttled up as needed, providing more fuel and air to the engine to generate more exhaust gas. Finally, regulator 240 can be used to reduce the pressure of the exhaust gas entering the fuel tanks 112, and can be used to limit the amount of gas flowing into the fuel tanks 112. Thus there are three ways to control the amount of exhaust being provided to the fuel tanks 112: control of engine 202 power, control of position of the bypass valve 216 and control of regulator 240 flow.

The system's 102 use of an independent combustion engine 202 provides several benefits. One benefit is that the fuel/air mixture can be controlled to ensure maximum conversion of oxygen to carbon dioxide through combustion, and therefore to ensure maximum removal of oxygen from the exhaust gas.

By way of background, combustion may be either complete or incomplete. In complete combustion, the ratio of hydrocarbon fuel to oxygen matches exactly such that all oxygen is used to combust the hydrocarbon fuel. Such an exact match is referred to as a "stoichiometric ratio." The stoichiometric ratio for hydrocarbon combustion depends on the specific hydrocarbon or hydrocarbon mixture present in the fuel. The only products of complete combustion with a stoichiometric ratio are $CO_2$ and $H_2O$, and all oxygen is used up. Thus, complete combustion of a hydrocarbon fuel with air when a stoichiometric ratio is present will remove all oxygen from the air and thereby render the gaseous combustion exhaust inert.

In incomplete combustion, oxygen and hydrocarbon fuel are both present, but at improper ratios, such that other combustion products are generated in addition to $CO_2$ and $H_2O$. Further, with incomplete combustion, some oxygen may remain unused and be left over if an insufficient amount of fuel is present.

Because the normal jet engines present on aircraft, as well as APUs, do not operate at a stoichiometric ratio, exhaust from those engines and APUs contains too much oxygen to be used to inert fuel tanks 112. However, with the use of the independent turbine engine 202 of the present system 102, the fuel-to-air mixture can be fine tuned to minimize the level of oxygen in the exhaust 204 and thus to render such exhaust 204 suitable for use in inerting fuel tanks 112.

Achieving a desirable stoichimetric mixture is facilitated with the use of oxygen sensor 214 which measures the oxygen content of the exhaust leaving the engine. The amount of fuel and air provided to the engine can be controlled based on the reading from this oxygen sensor 214. If oxygen is detected at a level higher than is desirable, additional fuel can be provided to the engine, or less air can be provided, depending on the amount of power needed by the other components of the system 102 and the amount of inert gas which is needed.

Additional details are now provided regarding the composition of exhaust 204 leaving the turbine engine 202 of the system 102 described herein. With complete combustion of hydrocarbons, the hydrocarbons are combined with oxygen to generate carbon dioxide and water. If the proper ratio of oxygen and hydrocarbons are present, combustion proceeds as follows:

$$C_xH_y + (x+y/4)O_2 \rightarrow xCO_2 + (y/2)H_2O$$

As can be seen, the product of combustion utilizing an exactly matching ratio does not contain any oxygen. Exhaust generated from such air would therefore be below the 9% oxygen combustibility threshold. If atmospheric air is utilized, such exhaust would comprise only $CO_2$, $H_2O$ and $N_2$ and other trace components dependent on the composition of the incoming air. The volumetric ratios of the components of the exhaust gas would depend on the exact composition of jet fuel being used. For a Kerosene based jet fuel such as Jet A commercial aviation fuel, an approximate fuel molecular formula of $C_{12}H_{26}$ would lead to complete combustion having the following formula:

$$C_{12}H_{26} + (37/2)O_2 \rightarrow 12CO_2 + 13H_2O$$

Assuming incoming air comprising 78% $N_2$, 21% $O_2$, and trace amounts of other elements (<1%), the formula becomes:

$$42/37 C_{12}H_{26} + 21 O_2 + 78 N_2 \rightarrow 504/37\ CO_2 + 546/37\ H_2O + 78 N_2$$

Nitrogen does not participate in the combustion here but is included in this formula only to illustrate ratios. The product of combustion is thus 504/37=13.62 parts $CO_2$, 546/37=14.756 parts $H_2O$, 78 parts $N_2$ and ~1 part other elements. The total number of parts is thus 107.36. Normalizing for percentage gives:

13.62/107.36=12.7% $CO_2$ by volume, 14.756/107.36=13.7% $H_2O$ by volume,
78/107.36=72.7% $N_2$ by volume, and 0% $O_2$ by volume.

Therefore the exhaust gas contains roughly 13% $CO_2$ by volume, 73% $N_2$ by volume and 14% $H_2O$ by volume. This significant amount of $CO_2$ provides benefits including the fact that $CO_2$ will diffuse out of the fuel tanks 112 at a slower rate than $N_2$, since $CO_2$ is a heavier molecule, thereby reducing the amount of gas that must be utilized to maintain the fuel tanks 112 in an inert state. Because of the presence of water vapor in the exhaust, drain features may be provided in the primary intercooler 228 and secondary intercooler 232. As the intercoolers 228, 232 cool the exhaust gas, the water vapor condenses out of the gas and may be drained in liquid form through drain holes 280.

These calculations of course assume complete combustion of the hydrocarbon fuel with all oxygen available in the incoming air. Realistically, however, even with a proper stoichiometric mixture of oxygen, complete combustion does not occur in such an ideal manner, and some oxygen is left uncombusted, while other gasses such as carbon monoxide (CO), oxides of nitrogen ($NO_x$), uncombusted hydrocarbons and other gasses are generated. Further, even with the proper stoichiometric mixture of oxygen, particulates and other impurities are present in the engine exhaust.

However, achievement of as near of a perfect stoichiometric mixture as possible ensures the lowest amount of $O_2$ gas in the exhaust. Further, undesirable gasses such as CO, $NO_x$ and other gasses may be removed with the use of catalytic converter 222, which works to convert such products to inert forms $CO_2$, $N_2$ and to further reduce $O_2$ levels beyond what is generated as a result of having a proper stoichiometric ratio. Particulates may be removed by separator 224 and by filter 238, described above.

Compared to previous systems, this system 102 produces several beneficial results because of the usage of an independent, dedicated engine 202, rather than use of the main aircraft engines or APU.

First, the exhaust gases generated by the system 102 contain less oxygen that what would be provided by the main engines or APU. Typically, the main thrust providing jet engines and any auxiliary power units (APUs) do not burn fuel at a stoichiometric mixture ratio, but rather burn fuel leaner than stoichiometric ratio so that the exhaust gas from those engines is higher in oxygen content than the ideal combustion described above. Thus, the independent, system specific engine 202, allows control over the fuel burn ratio and ensures minimum oxygen output.

The independent engine 202 also provides additional benefits, such as the fact that the system is completely independent of main power, that usage of bleed air from the main engines, which would reduce efficiency of those engines, is not required and that inert gas output can be greatly scaled up or down as needed, simply by increasing or decreasing the power output of the engine 202.

Use of an independent engine allows output to be greatly scaled up such that the system 102 can serve the dual purpose of being available for fire extinguishing purposes. Normally, an independent fire extinguishing system is used, containing one or a combination of fire suppression agents, which are released upon detection of increased heat or a fire. The fire suppression agent must be stored and therefore takes up weight and space on the aircraft. The high output capacity of system 102 permits its usage for fire extinguishing using the generated inert gas which can be released into the area of the aircraft at which a fire is occurring in order to displace the oxygen and render the area incombustible. The ability of system 102 to generate the inert gas at a high capacity would therefore remove the requirement for storage of an independent fire suppression agent.

Figure 3:
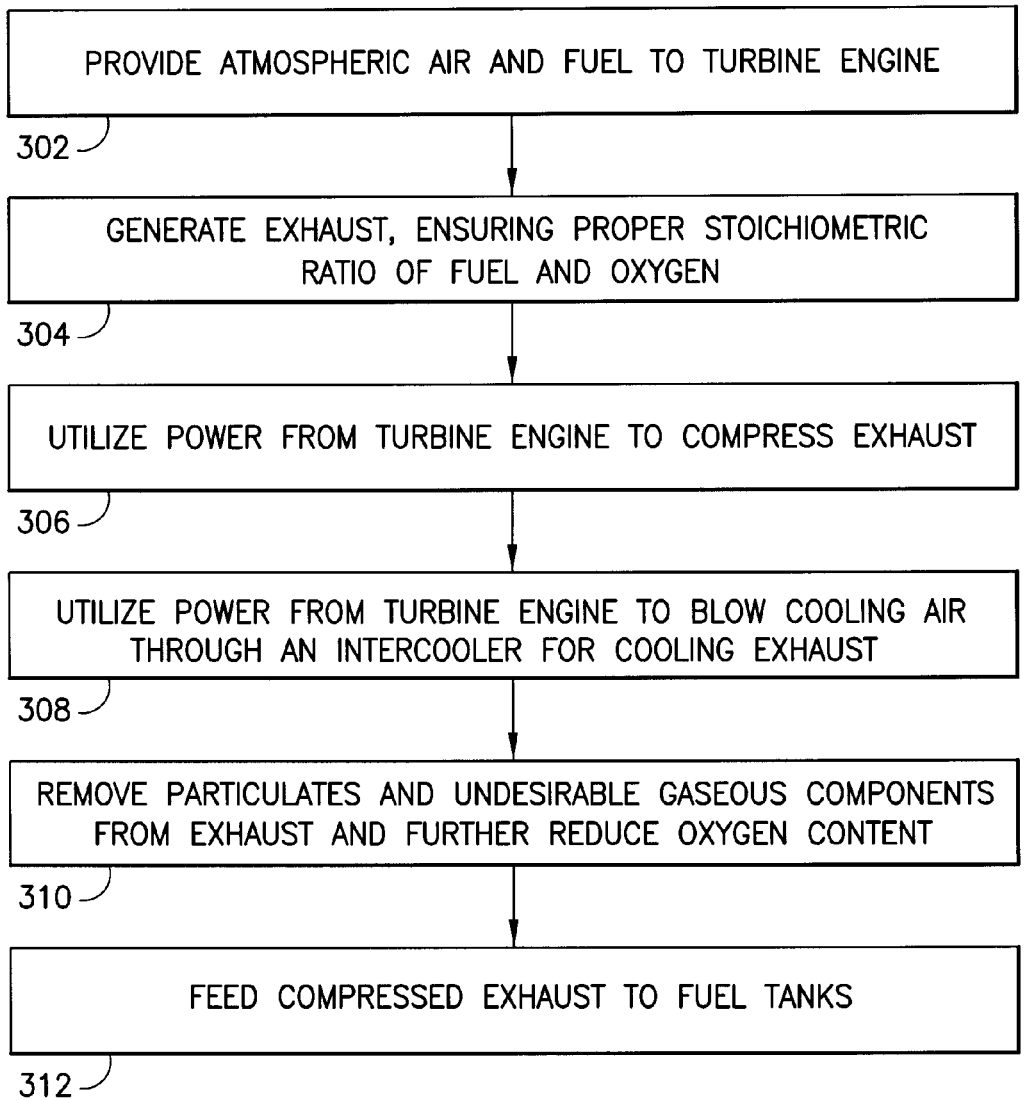
FIG. 3 is an illustration of steps of a method for generating inert gas as disclosed herein.

Referring to FIG. 3, a method of inerting a fuel tank will be described. In step 302, atmospheric air and fuel are provided to a turbine engine. In step 304, exhaust is generated, and it is ensured that the oxygen content of the exhaust is below a predetermined threshold. In step 306, power generated by the turbine engine is used to compress the exhaust. In step 308, power from the turbine engine is used to operate a blower to provide cooling atmospheric air to an intercooler in order to cool the compressed exhaust. In step 310, particulates and undesirable gaseous components are removed from the exhaust. Finally, in step 312, the compressed exhaust is provided to fuel tanks.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation to the teachings of the disclosure without departing from the essential scope thereof. Therefore it is intended that the disclosure not be limited to the particular embodiment disclosed herein contemplated for carrying out the methods of this disclosure, but that the disclosure will include all embodiments falling within the scope of the appended claims.

I claim:

1. A method of inerting a fuel tank in an aircraft having a main thrust generating engine and an auxiliary power unit, comprising the steps of:
    providing a dedicated turbine engine;
    combusting hydrocarbon fuel with oxygen in said dedicated turbine engine positioned in the aircraft, said dedicated turbine engine operating independent of the main thrust generating engine and said auxiliary power unit;
    operating said dedicated turbine engine at a stoichiometric ratio to generate engine exhaust comprising carbon dioxide and having an oxygen content below a predetermined threshold;
    cooling said engine exhaust with a first cooling air flow from a blower powered by said dedicated turbine engine;
    compressing said engine exhaust in a compressor powered by said dedicated turbine engine to generate compressed exhaust;
    cooling said compressed exhaust with a second cooling air flow from the blower; and
    directing said compressed exhaust into the fuel tank.

2. The method of claim 1, further comprising:
    detecting the amount of oxygen present in said engine exhaust and providing information to a control system for controlling the amount of fuel being provided to a said dedicated turbine engine and the speed of combustion of said dedicated turbine engine; and
    detecting the temperature of said compressed exhaust and providing information to said control system.

3. The method of claim 2, further comprising:
    removing particulates from said engine exhaust.

4. The method of claim 2, further comprising:
    changing an output of the turbine engine to control the amount of engine exhaust provided to the compressor.

5. The method of claim 2, further comprising:
    filtering said compressed exhaust to remove particulates.

6. An aircraft comprising:
    an aircraft body;
    a fuel tank;
    a main thrust generating engine;
    an auxiliary power unit;
    a dedicated turbine engine operating at a stoichiometric ratio positioned in the aircraft and operable independent of the main thrust generating engine and said auxiliary power unit, the dedicated turbine engine configured to combust hydrocarbon fuel with oxygen to generate engine exhaust comprising carbon dioxide and having an oxygen content below a predetermined threshold;
    a compressor powered by said dedicated turbine engine, said compressor operable to compress said engine exhaust to generate compressed exhaust;
    a blower powered by said dedicated turbine engine and operable to provide a first cooling air flow to a first heat exchanger and a second cooling air flow to a second heat exchanger, said first heat exchanger configured to receive said compressed exhaust and utilize said first cooling air flow to cool said compressed exhaust, said second heat exchanger configured to utilize said second cooling air flow to cool said engine exhaust before said engine exhaust is compressed; and
    a fuel tank feed line configured to direct said compressed exhaust into the fuel tank.

7. The aircraft of claim 6, further comprising:
    a bypass valve positioned between said turbine engine and an engine exhaust outlet, said bypass valve operable to control the amount of engine exhaust provided to said compressor; and
    an oxygen sensor configured to detect the amount of oxygen present in said engine exhaust and provide information to a control system for controlling the amount of fuel being provided to said turbine engine and the speed of combustion of said turbine engine.

8. The aircraft of claim 7, further comprising:
    a catalytic converter interposed between said turbine engine and said compressor; and
    a particulate separator interposed between said turbine engine and said compressor, said particulate separator configured to remove particulates from said engine exhaust.

9. The aircraft of claim 7, further comprising:
    a filter operable to filter said compressed exhaust; and
    a regulator configured to control the pressure of the compressed exhaust provided to said fuel tank.

10. The aircraft of claim 6, further comprising:
    an oxygen sensor configured to detect the amount of oxygen present in said engine exhaust and provide information to a control system for controlling the amount of fuel being provided to said dedicated turbine engine and the speed of combustion of said dedicated turbine engine.

11. The aircraft of claim 10, further comprising:
    a temperature sensor configured to detect the temperature of said compressed exhaust and provide information to said control system.

12. The aircraft of claim 6, wherein changing an output of the turbine engine changes an amount of compressed exhaust that is generated by said compressor.

* * * * *